US009726219B2

(12) United States Patent
Gallas et al.

(10) Patent No.: US 9,726,219 B2
(45) Date of Patent: Aug. 8, 2017

(54) THRUST WASHER

(71) Applicants: Mahle Engine Systems UK Ltd, Rugby (GB); Mahle Composants Moteur France SAS, Chavanod (FR); Mahle Industries, Incorporated, Farmington Hills, MI (US); Mahle Engine Components Slovakia S.R.O., Dolny Kubin (SK); Mahle International GmbH, Stuttgart (DE)

(72) Inventors: Tino Gallas, Leamington Spa (GB); Ha Tran, Rugby (GB); Mark Sharpe, Warwickshire (GB); Stephane Barral, Saint Martin Bellevue (FR); Kevin Berkery, Ann Arbor, MI (US); Miroslav Bukna, Ruzomberok (SK); Murray Scott, Oravsky Biely Potok (SK)

(73) Assignees: Mahle Engine Systems UK Ltd (GB); Mahle Composants Moteur France SAS (FR); Mahle Industries, Incorporated, Farmington Hills, MI (US); Mahle Engine Components Slovakia S.R.O. (SK); Mahle International GmbH (DE)

( * ) Notice: Subject to any disclaimer, the term of this patent is extended or adjusted under 35 U.S.C. 154(b) by 0 days.

(21) Appl. No.: 14/905,924

(22) PCT Filed: Jul. 17, 2014

(86) PCT No.: PCT/EP2014/065345
§ 371 (c)(1),
(2) Date: Jan. 18, 2016

(87) PCT Pub. No.: WO2015/007826
PCT Pub. Date: Jan. 22, 2015

(65) Prior Publication Data
US 2016/0160908 A1    Jun. 9, 2016

(30) Foreign Application Priority Data

Jul. 18, 2013    (GB) .................................. 1312880.6

(51) Int. Cl.
*F16C 17/04*        (2006.01)
*F16C 33/04*        (2006.01)
(Continued)

(52) U.S. Cl.
CPC ................ *F16C 17/04* (2013.01); *F16C 9/02* (2013.01); *F16C 17/10* (2013.01); *F16C 33/046* (2013.01); *F16C 33/1065* (2013.01); *F16C 43/02* (2013.01)

(58) Field of Classification Search
CPC .... F16C 17/10; F16C 33/046; F16C 33/1065; F16C 43/02; F16C 9/02; F16C 17/04
See application file for complete search history.

(56) References Cited

U.S. PATENT DOCUMENTS 4,133,586 A * 1/1979 Maurer ..................... F16C 9/02
                                                        384/429
4,533,261 A * 8/1985 Losio ...................... F16C 17/10
                                                        384/129
(Continued)

FOREIGN PATENT DOCUMENTS

EP        2233759 A2     9/2010
WO    WO-2013/068106 A1  5/2013
WO    WO-2015/007826 A1  1/2015

OTHER PUBLICATIONS

English abstract for EP-2233759.

*Primary Examiner* — Alan B Waits
(74) *Attorney, Agent, or Firm* — Fishman Stewart PLLC

(57) ABSTRACT

A thrust washer for a flange half-bearing may include a semi-annular panel having an inner edge and an outer edge. A plurality of hooking lugs may project inwardly from the (Continued)

inner edge of the panel. The hooking lugs may have at least one latching edge configured to engage with a corresponding opening in a bearing shell received by the thrust washer and prevent disconnection of the thrust washer and the bearing shell without deformation of the bearing shell. The hooking lugs may have a hooking lug inner portion proximate to a central part of the thrust washer around the inner edge of the panel for engaging against an edge of the corresponding opening of the bearing shell, and a hooking lug outer portion remote from the central part around the inner edge of the panel. The hooking lug inner portion may be thinner than the hooking lug outer portion.

20 Claims, 6 Drawing Sheets

(51) Int. Cl.
*F16C 9/02* (2006.01)
*F16C 43/02* (2006.01)
*F16C 33/10* (2006.01)
*F16C 17/10* (2006.01)

(56) References Cited

U.S. PATENT DOCUMENTS

| | | | | |
|---|---|---|---|---|
| 4,652,150 | A * | 3/1987 | New | F16C 17/10 384/275 |
| RE32,764 | E * | 10/1988 | Smith | F16C 17/10 384/275 |
| 5,114,246 | A * | 5/1992 | Gowan | F16C 17/10 384/275 |
| 5,520,466 | A * | 5/1996 | Everitt | F16C 9/02 384/124 |
| 6,471,405 | B1 * | 10/2002 | Bickle | F16C 17/10 384/275 |
| 8,376,618 | B2 * | 2/2013 | Lehmann | F16C 9/00 384/275 |
| 8,449,193 | B2 * | 5/2013 | Kuwabara | F16C 43/02 384/420 |
| 9,016,948 | B2 * | 4/2015 | Patel | F16C 43/02 384/420 |
| 2003/0128902 | A1 * | 7/2003 | Kennedy | F16C 9/02 384/275 |
| 2011/0200281 | A1 * | 8/2011 | Uehara | F16C 9/00 384/428 |

* cited by examiner

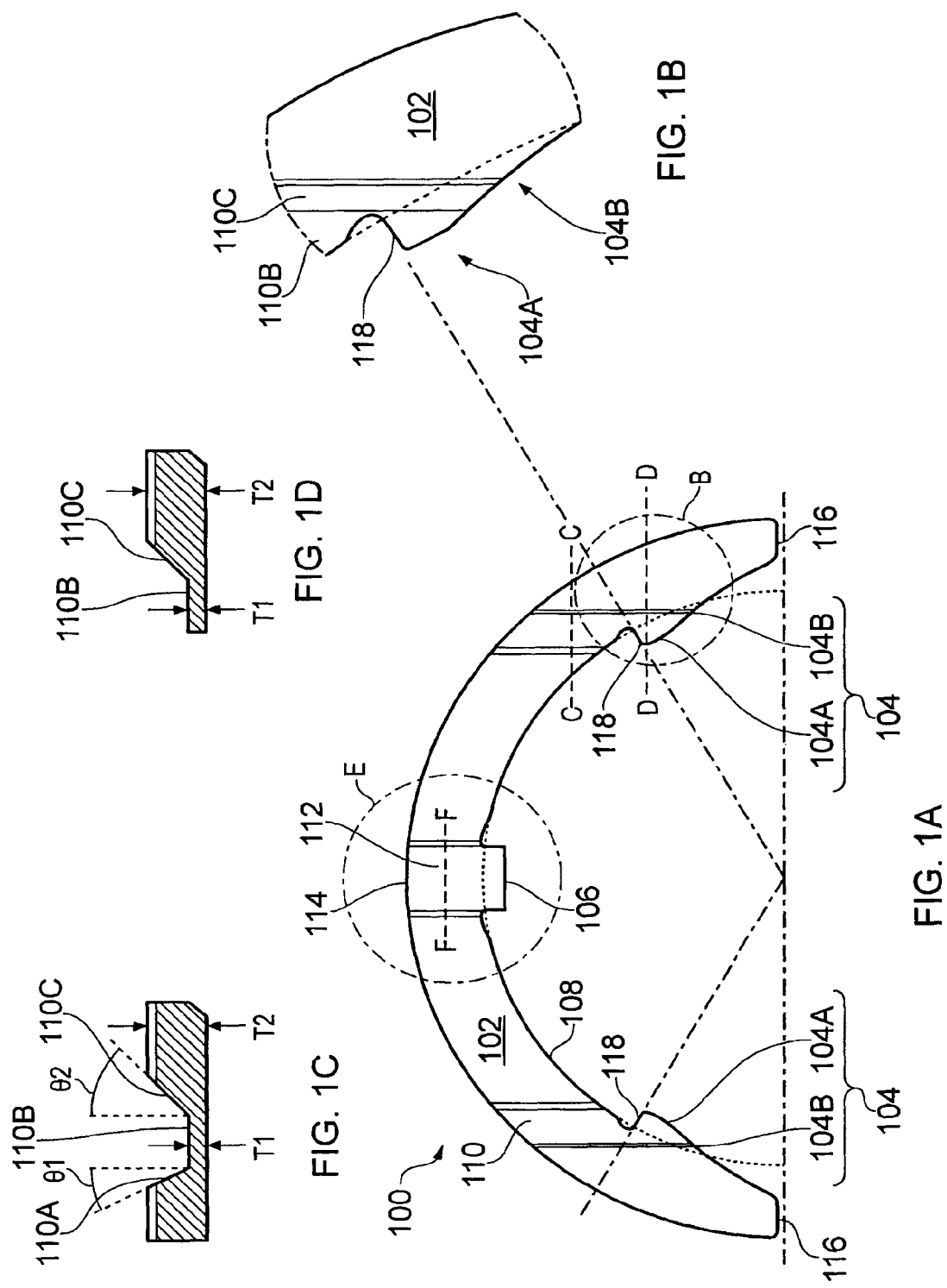

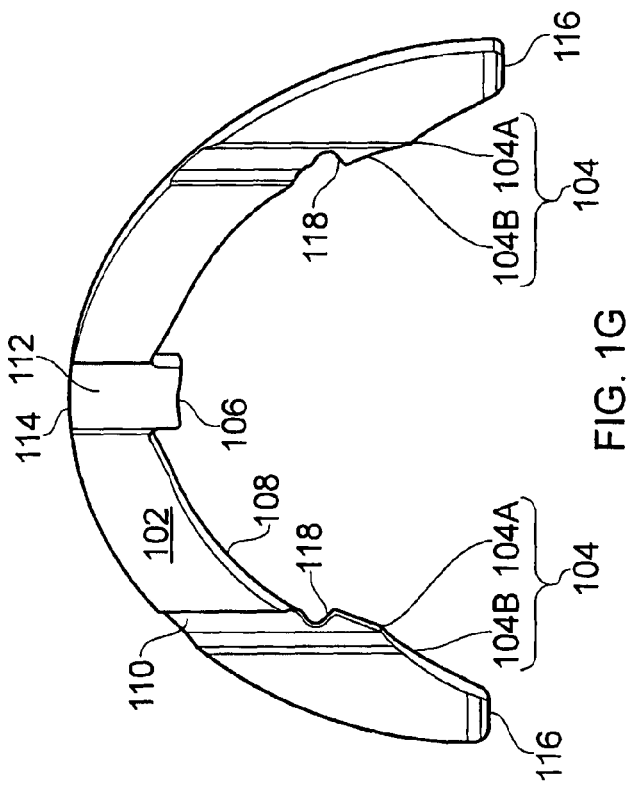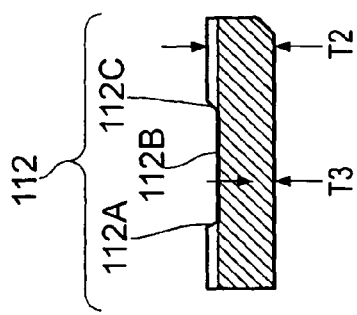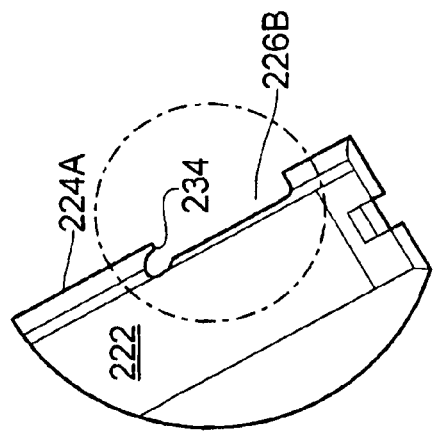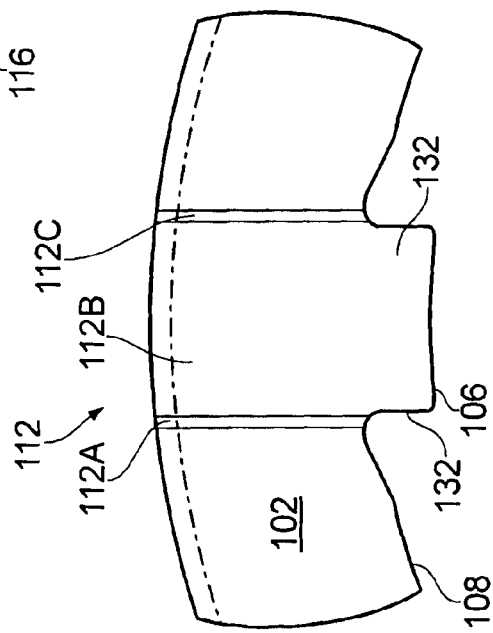

THRUST WASHER

CROSS-REFERENCE TO RELATED APPLICATIONS

This application claims priority to British Patent Application No. 1312880.6, filed Jul. 18, 2013, and International Patent Application No. PCT/EP2014/065345, filed Jul. 17, 2014, both of which are hereby incorporated by reference in their entirety.

TECHNICAL FIELD

The present invention relates to thrust washers having an axial face provided with oil distribution grooves, in particular thrust washers for use in automotive engines, transmission, pump and compressor systems.

BACKGROUND

In internal combustion engines, the bearing assemblies typically each comprise a pair of half-bearings retaining a crankshaft that is rotatable about an axis. For crankshaft journal bearing assemblies, at least one half-bearing is a flange half-bearing that comprises a hollow generally semi-cylindrical bearing shell provided with a generally semi-annular thrust washer extending outwardly (radially) at each axial end. In some flange half-bearings, a single-piece construction of the bearing shell and thrust washers is used, whilst in other half-bearings, the bearing shell and the thrust washer are loosely mechanically engaged with clip-like features, and in a further type of half-bearing the thrust washers are permanently assembled onto the bearing shell by deformation of engagement features.

Known clip-like features for loosely mechanically engaging a thrust washer around the outer surface of a semi-cylindrical bearing shell, at an axial end, have a generally semi-annular panel with a pair of hooking lugs (tabs) projecting inwardly from the semi-circular inner edge. The hooking lugs hook into corresponding openings in the bearing shell, in use, when the thrust washer is connected around the outer surface at an axial end of the bearing shell. The inwardly projecting hooking lugs are located to either side of the crown of the bearing, towards the joint faces, and are shaped to enable the thrust washer to be assembled onto the bearing shell when the bearing shell has been resiliently deformed by pinching together the joint faces (circumferential end faces). The arrangement by which the hooking lugs engage with the openings (recesses) prevents separation once the bearing shell has returned to the relaxed position, and also prevents separation when the bearing shell has been slightly pinched together through being held in an interference fit with a housing, within the full bearing assembly. The hooking lugs have a uniform thickness and are machined to be thinner than the main semi-annular panel of the thrust washer, to enable the use of (axially) narrow openings in the bearing shell. One or more stabilisation lugs may be provided intermediate the hooking lugs, projecting inwardly from the inner edge of the semiannular main panel, to reinforce the connection between the thrust washer and bearing shell, to prevent wear leading to substantial relative rotation of the thrust washer and bearing shell.

U.S. Pat. No. 4,533,261, EP2233759 and WO2013068106 illustrate flange half-bearings, in which thrust washers are loosely mechanically engaged with bearing shells with clip-like features by the engagement of thin hooking lugs of uniform thickness within openings in a corresponding bearing shell.

SUMMARY

According to a first aspect, there is provided a thrust washer for a flange half-bearing, the thrust washer comprising:

a substantially semi-annular panel having an inner edge and outer edge; and hooking lugs projecting inwardly from the inner edge of the panel, wherein the hooking lugs have latching edges that are configured to engage within corresponding openings in a bearing shell received by the thrust washer and to prevent disconnection of the thrust washer and bearing shell without deformation of the bearing shell, each hooking lug has a hooking lug inner portion proximate, around the inner edge of the panel, to the central part of the thrust washer for engaging against edges of the openings in the bearing shell and a hooking lug outer portion remote, around the inner edge the panel, from the central part of the thrust washer, and the hooking lug inner portion is thinner than the hooking lug outer portion.

According to a second aspect, there is provided a flange half-bearing comprising one or more thrust washers according to the first aspect that are connected to a semi-cylindrical half journal bearing shell having openings in or proximate an axial end face in correspondence with the lugs of the thrust washer.

According to a third aspect, there is provided an engine comprising a bearing assembly according to the second aspect.

The thrust washer may have a bearing face provided with a plurality of first oil distribution grooves extending to the inner edge of the panel, and a first oil distribution groove extends across the hooking lug inner portion.

The first oil distribution grooves may not extend across the hooking lug outer portions, and the hooking lug outer portions may each correspond in thickness with the thickness of the panel adjacent the hooking lug outer portion.

The first oil distribution grooves may extend across the hooking lug outer portions, and the part of each first oil distribution groove that extends across each hooking lug inner portion may be deeper than the part of each first oil distribution groove that extends across the hooking lug outer portion.

Each first oil distribution groove may comprise a region of constant depth between sloping sides, and the latching edges may be within the constant depth regions of the respective first oil distribution grooves.

At the deepest part of the first oil distribution grooves, the thrust washer may have a thickness that is less than half of the mean thickness of the panel outside of the grooves.

The thrust washer may further comprise a stabilisation lug projecting inwardly from the inner edge of the panel and intermediate the hooking lugs.

The stabilisation lug may have a uniform thickness.

The thrust washer may have a bearing face provided with a second oil distribution groove extending to the inner edge of the panel, and the second oil distribution groove may extend across the stabilisation lug.

The oil distribution grooves may extend parallel across the bearing face.

The oil distribution grooves may extend from the inner edge of the panel to the outer edge of the panel.

BRIEF DESCRIPTION OF THE DRAWINGS

Embodiments of the invention are further described hereinafter with reference to the accompanying drawings, in which:

FIG. 1A illustrates a substantially semi-annular thrust washer;

FIG. 1B illustrates an enlarged view of circle B in FIG. 1A;

FIG. 1C illustrates a cross-sectional view along line C-C in FIG. 1A;

FIG. 1D illustrates a cross-sectional view along line D-D in FIG. 1A;

FIG. 1E illustrates an enlarged view of circle E in FIG. 1A;

FIG. 1F illustrates a cross-sectional view along line F-F in FIG. 1A;

FIG. 1G illustrates a perspective view of the thrust washer of FIG. 1A;

FIG. 3C illustrates an enlarged view of an opening for receiving a hooking lug in FIG. 3A.

DETAILED DESCRIPTION

Like numbers refer to like elements throughout.

Figure 2A:
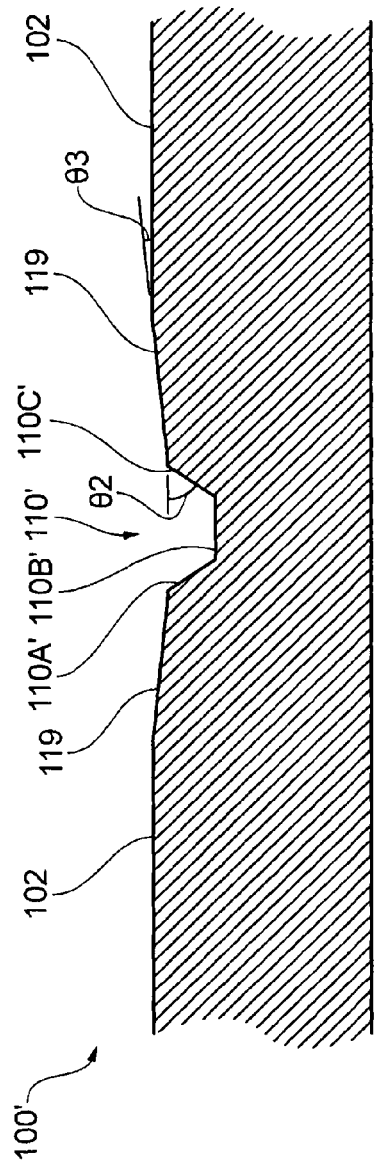
FIGS. 2A and 2B illustrates a cross-sectional views through lateral oil distribution grooves of further thrust washers.
Figure 2B:
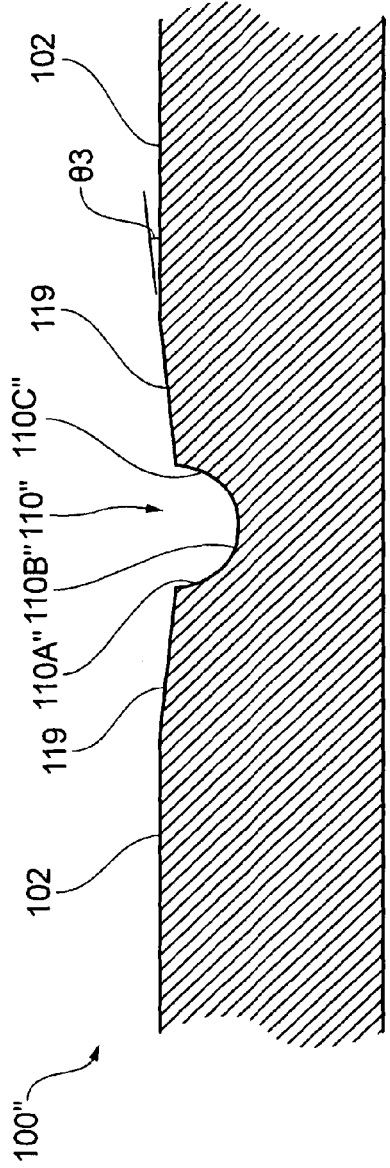

FIGS. 1A to 1G, FIGS. 3A to 3C and FIGS. 4A and 4B illustrate components of a flange half-bearing, including embodiments of a thrust washer, with enlarged and sectional views. FIGS. 2A and 2B illustrate sectional views through thrust washers of alternative embodiments. FIG. 1A illustrates an axial view of the bearing side of a thrust washer 100, which has a generally semi-annular main body portion (panel) 102 with hooking lugs 104 and a stabilisation lug 106 projecting from the inner edge 108, and FIG. 1G shows a corresponding perspective view. Lateral oil distribution grooves (first oil distribution grooves) 110 and an intermediary oil distribution groove (second oil distribution groove) 112 are provided in the bearing side of the thrust washer 100 for enhancing the distribution of oil between the bearing side of the thrust washer and the counterface of an associated crankshaft web, in use. The opposite side of the thrust washer is generally flat. The oil distribution grooves 110 and 112 extend to the generally semi-circular inner edge 108 of the main body portion 102 of the thrust washer 100 and onto the hooking lugs 104 and 106, as is shown in more detail in FIGS. 1B and 1E, which correspond with the circles indicated by B and E in FIG. 1A.

FIGS. 1C and 1D show cross-sectional views through the thrust washer 100 along lines C-C and D-D in FIG. 1A. Within the lateral oil distribution groove 110, the thrust washer 100 has a minimum thickness, T1. Outside of the oil distribution grooves 110 and 112, the main body portion 102 of the thrust washer 100 has a thickness T2. The lateral oil distribution grooves 110 are sufficiently deep that the minimum thickness T1 within the lateral oil distribution grooves is less than half the thickness T2 of the main body portion 102 outside of the oil distribution grooves 110 and 112.

The hooking lugs 104 each comprise a hooking lug inner portion 104A and a hooking lug outer portion 104B, being portions of each hooking lug that are respectively closest to and furthest from the opposite hooking lug, with closest and furthest relating to the circumferential measurement around the inner edge 108 of the main body portion 102.

The extension of the lateral oil distribution grooves 110 across the hooking lug inner portions 104A enables the lateral oil distribution grooves in the main body portion 102 of the thrust washer 100 and the thinner hooking lug inner portions 104A to be formed in a single machining step. Further, the thrust washers 100 can be stamped or otherwise cut from a sheet material on which the oil distribution grooves are pre-formed. Preferably parallel grooves are formed along the sheet material, from which the thrust washers are formed to provide parallel lateral oil distribution grooves 110 (and optionally also the intermediate oil distribution grooves 112). This enables the thrust washer to be formed by a simplified and less expensive manufacturing process than for known thrust washers.

In the illustrated thrust washer 100, the lateral oil distribution groove 110 extends across the hooking lug inner portions 104A, but does not extend across not across the hooking lug outer portions 104B. The outer portions 104B have the same thickness as the main body portion 102 outside of the grooves 110 and 112, which is thicker than the inner portions 104A.

Alternatively, the hooking lugs 104 may lie fully within the lateral oil distribution grooves 110, such that the hooking lug inner portion 104A is within a part of the groove that is deeper, and the hooking lug outer portion 104B is within a part of the groove that is less deep, and the outer portions 104B are thicker than the inner portions 104B.

The hooking lugs are spaced between the crown 114 and an end 116 of the thrust washer 100. The hooking lug inner portions 104A of the hooking lugs 104 have latching edges 118 that are configured to mechanically engage with openings of a bearing shell to retain the bearing shell between the hooking lugs, thereby to hold the thrust washer and a bearing shell together (e.g. in a mating fit), in use. The latching edges 118 face in a generally inward direction, towards the opposite hooking lug 104, and away from the open region between the ends 116 (i.e. the latching edges taper inwardly towards the open side of the thrust washer 100, between the ends 116).

The hooking lug inner portions 104A are thinner than the hooking lug outer portions 104B. The relative thinness of hooking lug inner portions 104A and the latching edges 116 enables the hooking lugs 104 to engage with axially shallow openings in the bearing shell, maximising the useable area of the journal bearing surface of the bearing shell. Further, the relative thickness of the hooking lug outer portions 104B reinforces the hooking lug 104, increasing its strength.

In the illustrated thrust washer 100, the lateral oil distribution grooves 110 have a flat bottom section 110B, having a constant minimum thickness T1, between sloping sides 110A and 110C. The sloping sides 110A and 110C slope at angles θ1 and θ2, each in the range of at least 2.5° (e.g. 65° and 45° in the illustrated thrust washer) relative to the opposite side (generally flat surface) of the thrust washer 100.

In the illustrated thrust washer 100, the latching edge 118 lies entirely within the flat bottom section 110B of the lateral oil distribution groove. Accordingly, the thickness of each hooking lug 104 adjacent the latching edge 118 is equal to the minimum thickness T1 of the lateral oil distribution grooves 110.

In the illustrated thrust washer 100, a single intermediate oil distribution groove 112 is shown intermediate and centrally aligned with respect to the lateral oil distribution grooves 110, aligned with a single stabilisation lug 106, which is symmetrically positioned at the crown 114, as shown in FIG. 1E, which corresponds with circle E in FIG. 1A.

Alternatively, there may be no intermediate oil distribution groove, or more than one intermediate oil distribution groove may be provided. Such further intermediate oil distribution grooves may alternatively or additionally be provided in other locations, with respect to the lateral oil distribution grooves, including between each lateral oil distribution groove and the respective end 116 of the thrust washer 100.

Similarly, alternatively, there may be no stabilisation lug provided, or more than one stabilisation lug may be provided, projecting from the inner edge 108 of the main body 102. Further, the stabilisation lug 106 or lugs may be arranged asymmetrically with respect the crown 114. Where provided, the stabilisation lug reinforces the action of the hooking lugs to resist relative rotation of the thrust washer and bearing shell.

The intermediate oil distribution groove 112 is wider (circumferentially around the inner edge 108 of the main panel 102) than the stabilisation lug 106, which is aligned with and lies entirely within the width of the intermediate oil distribution groove. The intermediate oil distribution groove 112 has a flat central section 112B (i.e. has a constant thickness T3) between sloping sides 112A and 112C, and the stabilisation lug 106 lies entirely within the flat central section 112B of the intermediate oil distribution groove, as shown FIG. 1F, which corresponds with the cross-section F-F in FIG. 1A.

In the illustrated embodiment, the (optional) intermediate oil distribution groove 112 is less deep than the maximum depth of the lateral oil distribution grooves 110, and has a broad flat bottom section 112B, and the (optional) stabilisation lug 106 is thicker than the minimum thickness of the hooking lugs 104. In a further embodiment, the intermediate oil distribution groove 112 may have the same depth profile as the lateral oil distribution grooves 110.

Although in the embodiment in FIGS. 1A to 1G, the main body 102 of the thrust washer 100 has a uniform thickness T2 outside of the oil distribution grooves 110 and 112, it is also known to provide shallow, gently ramped regions 119 outside the oil distribution grooves. FIG. 2A illustrates a cross-sectional view (corresponding with the view indicated by the line C-C on the thrust washer 100 in FIG. 1A) through a thrust washer 100' and lateral oil distribution groove 110' according to a further embodiment, in which a ramped region 119 is provided on each side of the intermediary groove. Such ramped regions 119, which are between the oil distribution grooves 110' and the regions of the main body portion 102 having the uniform maximum thickness, slope by less than 1:40 (e.g. an increase in thickness of less than 0.025 mm across 1 mm of the surface), i.e. θ3 is less than 1.5°, relative to the back of the thrust washer. In contrast, the oil grooves 110' have sides 110A' and 110C' that slope by more than 1:25, i.e. θ2 (and similarly θ1) is greater than or equal to 2.5°.

Although in FIG. 2A the lateral oil distribution grooves 110' have sides 110A' and 110C' of constant gradient, and a flat bottom section 110B' that is parallel with the generally flat opposite side of the thrust washer 100', the lateral oil distribution grooves may alternatively have other sectional shapes, e.g. curved grooves 110", as illustrated in the corresponding cross-sectional view through a thrust washer 100" in FIG. 2B. Again, the sides 110A" and 110C", between which the bottom section 110B" of the oil distribution groove is located, slope by more than 1:25. In the case of a curved lateral oil distribution groove 110", the latching edge is preferably within the bottom section 110B" of the groove, where the thickness is approximately at a minimum (i.e. corresponding with approximately the deepest part of the groove).

Figure 3A:
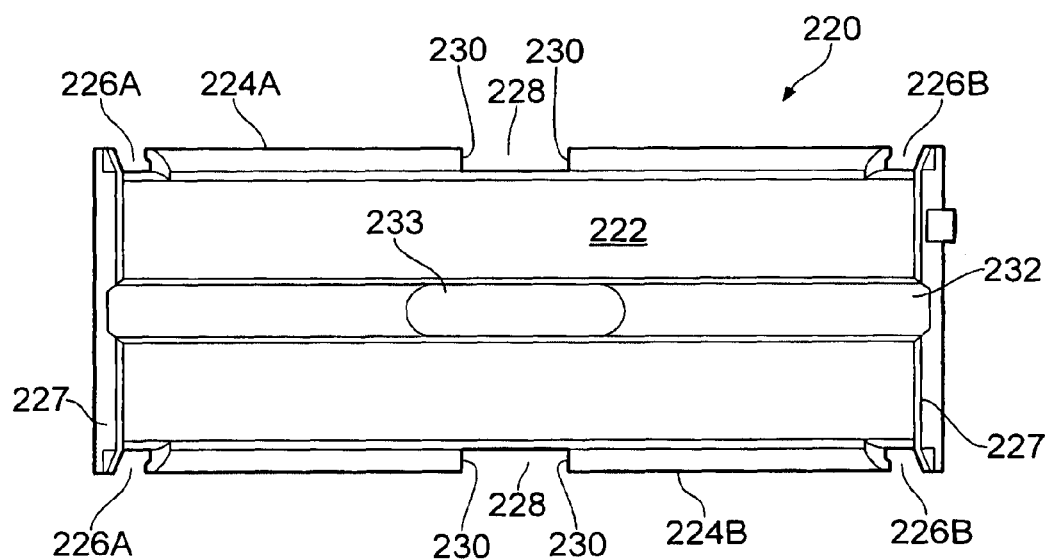
FIGS. 3A and 3B illustrate a plan and side views of a semi-cylindrical half journal bearing shell.
Figure 3B:
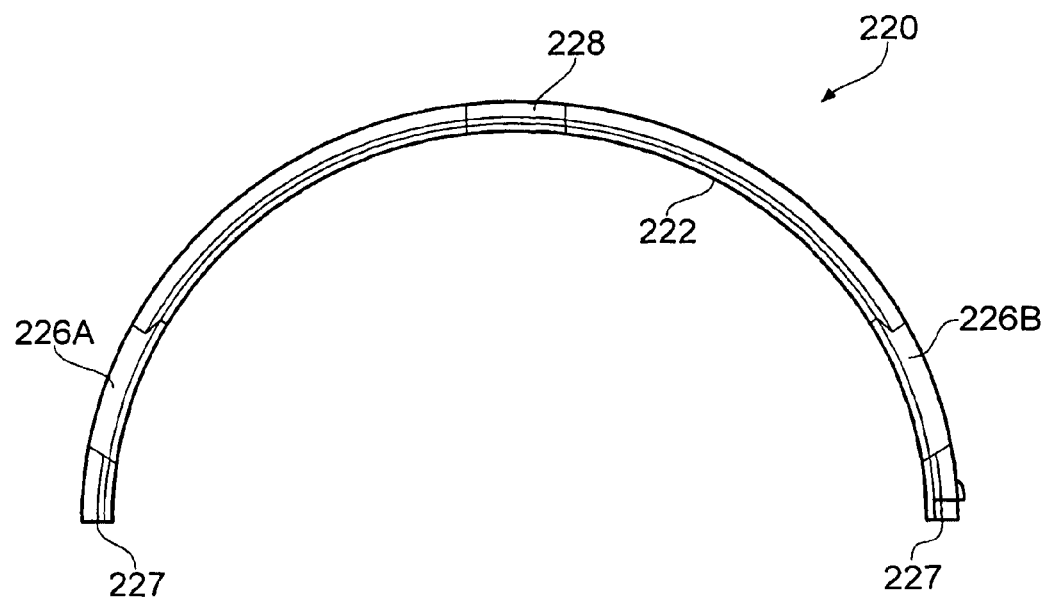

FIG. 3A shows a view of a semi-cylindrical half journal bearing shell 220, viewed towards the concave, inner surface 222, and FIG. 3B shows an axial, side view of the bearing shell. The bearing shell 220 has axial end faces 224A and 224B, each of which has lateral hooking openings 226A and 226B close to the joint faces 227 and (optionally) a stabilisation opening 228. The bearing shell 220 is additionally provided with a circumferential groove 232 along the concave, inner surface 222, and has an oil supply hole 233 to the circumferential groove, through the thickness of the bearing shell. The stabilisation openings 228 are rectangular in shape and have parallel side edges 230 that run axially, perpendicular to the axial end faces 224A and 224B.

Each stabilisation opening 228 is dimensioned in correspondence with the width and thickness of the stabilisation lug 106 of the thrust washer 100. The stabilisation opening 228 has a circumferential width (i.e. around the axial faces 224A and 224B) greater than the circumferential width of the stabilisation lug 106, e.g. with a total clearance of about 1 mm. The axial depth of the stabilisation opening is preferably greater than or equal to the axial thickness of the stabilisation lug 106, and may be about the same thickness as the main body 102 of the thrust washer 100. The stabilisation opening 228 is symmetrically positioned between the joint faces 227, at the middle of the axial end face 224A and 224B of the bearing shell 220, in correspondence with the symmetrically position of the stabilisation lug 106 on the thrust washer 100.

FIG. 3C shows an enlarged view of a lateral hooking opening 226B, showing the hooking side edge 234, which is angled non-perpendicularly to the axial end face 224A, such that when a hooking lug inner portion 104A is connected within of the lateral hooking openings 226A and 226B, the hooking lugs 104 are prevented from exiting the lateral hooking openings in an axial direction. In particular, the lateral hooking openings 226A and 226B are shaped to receive the hooking lugs inner portions 104A behind the hooking side edge 234, such that the latching edges 118 may mechanically engage with the hooking side edges 234.

The lateral hooking openings 226A and 226B are recessed into the bevelled regions at the axial edges of the bearing shell 220, as it would typically be undesirable for such openings to be present in the cylindrically-shaped journal bearing surface of the bearing shell, which is between the bevelled regions. Accordingly, by use of hooking lug inner portions 104A that are thinner than the hooking lug outer portions 1048, the bevelled regions at the axial edges of the bearings shell 220 may be (axially) narrower, thereby maximising the width of the journal bearing surface of the bearing shell, and improving the performance of the bearing, in use.

It will be appreciated that not all half-bearings may be provided with the circumferential groove 232 and/or the oil supply hole 233. In particular, when two half-bearings are used together, one may have such a groove and oil supply hole, and the other may not. Further, both half-bearings may be of the type described herein, or one may be such a half-bearing and the other may be a half-bearing of an alternative known design.

Figure 4A:
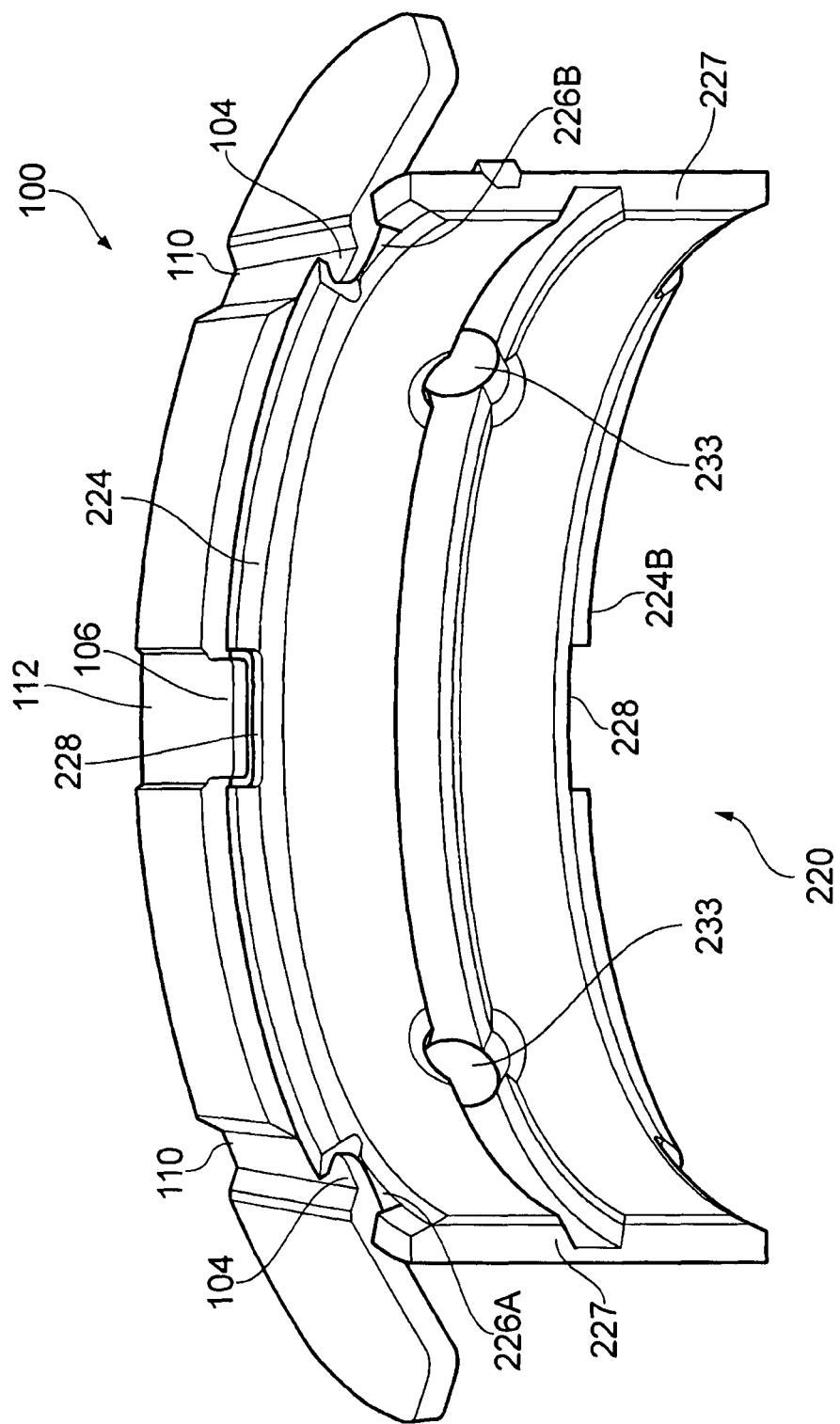
FIG. 4A illustrates a thrust washer of FIG. 1A assembled onto a bearings shell of FIG. 3A.
Figure 4B:
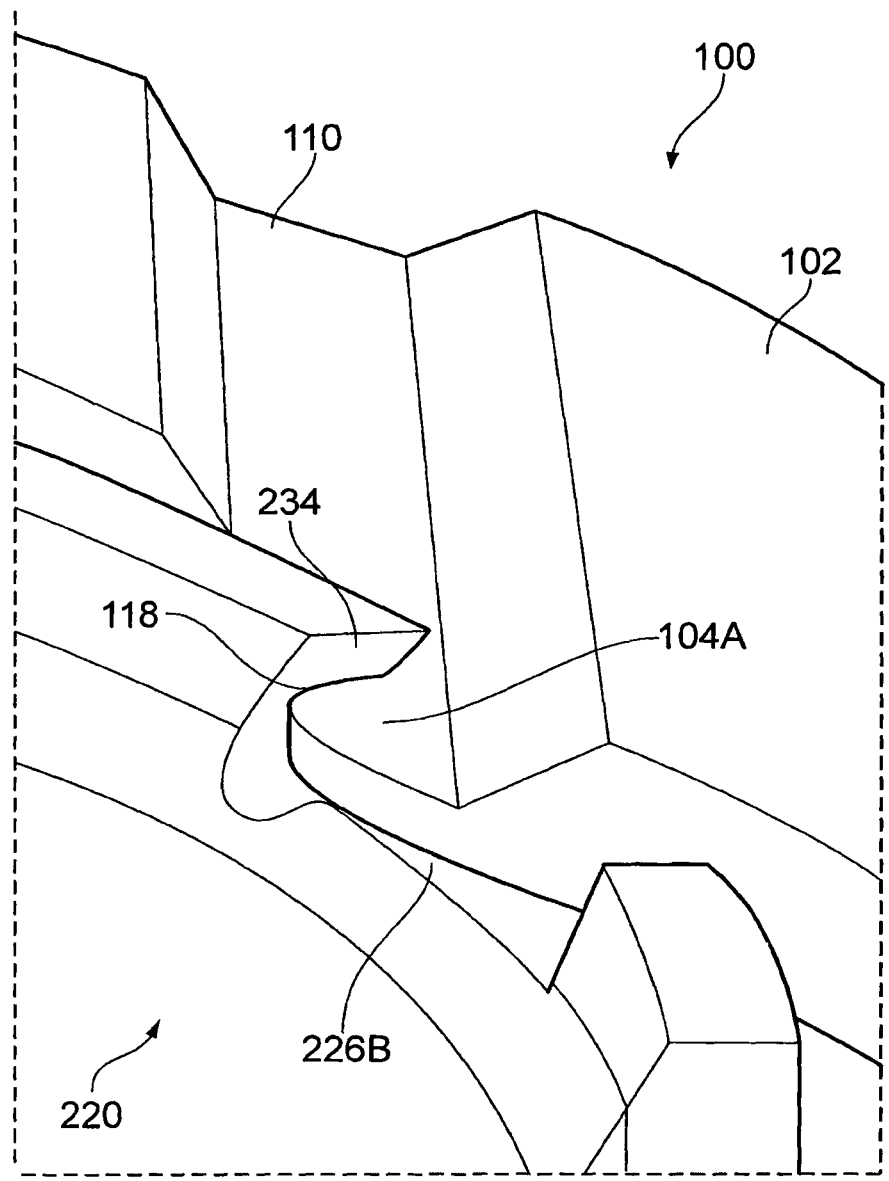
FIG. 4B illustrates and enlarged view of a hooking lug and corresponding opening.

FIG. 4A shows a semi-annular thrust washer 100 assembled onto a semi-cylindrical half journal bearing shell 220, at the first axial end face 224A, which are connected together by the hooking lugs 104 being hooked within the hooking openings 226A and 226B, and having the stabilisation lug 106 received into the stabilisation opening 228. A fully assembled flange half-bearing comprises a second thrust washer correspondingly assembled onto the second axial end face 226B of the bearing shell 220. FIG. 48 illustrates an enlarged view of a lateral hooking lug 104 and a lateral hooking opening 226B of FIG. 4A.

The thrust washers 100 are assembled onto the bearing shell 220 by pinching together the joint faces 227 to elastically deform the bearing shell, aligning the bearing shell with respect to the thrust washers 100A and 100B, and then releasing the bearing shell, so that it radially expands to engage the lugs 104A, 104B and 106 within the openings 226A, 226B and 228. Accordingly, the thrust washers 100 become mechanically engaged (latched) onto the bearing shell 220, in a hooked manner. In particular, the latching edges 118 of the lateral hooking lugs 104 converge towards the opening between the ends of the thrust washer 100, which prevents the engaged lateral hooking lugs 104 from exiting the openings 226A and 226B perpendicular to the axis of the bearing shell, when the bearing shell is in the relaxed state, or when assembled in an interference fit within the fully assembled journal bearing.

Whilst permitting a small amount of relative axial play, the projection of the stabilisation lug 106 into the stabilisation opening 228 further stabilises the thrust washer 100 with the bearing shell 220. This helps prevent substantial relative axial movement of the crown 114 of the thrust washer 100 and bearing shell 220. In addition to the engagement of the latching edges 118 with the lateral hooking openings 226A and 226B, the engagement of the rotational stabilisation edges 132 of the stabilisation lug 106 within the openings 228, between the parallel side edges 230 of the openings 228, also helps prevent substantial relative rotational movement of the thrust washer(s) 100 and the bearing shell 220, with respect to the axis of the bearing shell 220, whilst again allowing a small amount of relative rotational play. The action of the stabilisation lug 106 and stabilisation opening 228 in preventing substantive relative rotation about the axis of the bearing shell 220 reduces the load and wear experienced by the hooking lugs 104. However, by strengthening the hooking lugs 104, as described, the requirements of the stabilisation lug may be reduced.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A thrust washer for a flange half-bearing, comprising:
   a substantially semi-annular panel extending about a rotation axis and having an inner edge and an outer edge; and
   a plurality of hooking lugs projecting inwardly from the inner edge of the panel, wherein the plurality of hooking lugs have at least one latching edge configured to engage within a corresponding opening in a bearing shell received by the panel and facilitate preventing disconnection of the panel and the bearing shell without deformation of the bearing shell;
   the plurality of hooking lugs each having a hooking lug inner portion proximate to a central part with respect to a circumferential direction of the axis and located around the inner edge of the panel for engaging against an edge of the corresponding opening in the bearing shell and a hooking lug outer portion remote from the central part with respect to the circumferential direction and located around the inner edge of the panel; and
   the hooking lug inner portion of at least one hooking lug is thinner in an axial direction of the axis than the hooking lug outer portion of the at least one hooking lug.

2. A thrust washer according to claim 1, further comprising a bearing face provided with a plurality of oil distribution grooves extending to the inner edge of the panel, and at least one of the plurality of oil distribution groove extends across the hooking lug inner portion of at least one of the plurality of hooking lugs.

3. A thrust washer according to claim 2, wherein the plurality of oil distribution grooves extend only in a region spaced apart from the hooking lug outer portion of the plurality of hooking lugs, and the hooking lug outer portion of the plurality of hooking lugs each correspond in thickness with a thickness of the panel adjacent the hooking lug outer portion of the plurality of hooking lugs.

4. A thrust washer according to claim 2, wherein the at least one of the plurality of oil distribution grooves extends across the hooking lug outer portion of the at least one of the plurality of hooking lugs, and wherein a part of the at least one of the plurality of oil distribution grooves that extends across the hooking lug inner portion of the at least one of the plurality of hooking lugs is deeper than another part of the at least one of the plurality of oil distribution grooves that extends across the hooking lug outer portion of the at least one of the plurality of hooking lugs.

5. A thrust washer according to claim 2, wherein the plurality of oil distribution grooves each include a region of constant depth between sloping sides, and the at least one latching edge of each of the plurality of hooking lugs has a depth within the constant depth of the plurality of oil distribution grooves.

6. A thrust washer according to claim 2, wherein at a deepest part of the plurality of oil distribution grooves, the panel has a thickness that is less than half of an average thickness of the panel outside of the plurality of oil distribution grooves.

7. A thrust washer according to claim 2, wherein the plurality of oil distribution grooves extend parallel to one another across the bearing face.

8. A thrust washer according to claim 2, wherein the plurality of oil distribution grooves extend from the inner edge of the panel to the outer edge of the panel.

9. A thrust washer according to claim 1, further comprising a stabilisation lug projecting inwardly from the inner edge of the panel and disposed intermediate to the plurality of hooking lugs.

10. A thrust washer according to claim 9, wherein the stabilisation lug has a uniform thickness.

11. A thrust washer according to claim 9, further comprising a bearing face including at least one other oil distribution groove extending to the inner edge of the panel, and the at least one other oil distribution groove extends across the stabilisation lug.

12. A thrust washer according to claim 1, further comprising a bearing face including at least one oil distribution groove extending from the outer edge to the inner edge of the panel and disposed intermediate of the plurality of hooking lugs.

13. A thrust washer according to claim 1, wherein at least one hooking lug of the plurality of hooking lugs is disposed at a distance in the circumferential direction from an end of the panel.

14. A flange half-bearing, comprising:
at least one thrust washer including:
a semi-annular panel extending about a rotation axis and having an inner edge and an outer edge;
a plurality of hooking lugs projecting inwardly from the inner edge of the panel, wherein the plurality of hooking lugs each have at least one latching edge;
the plurality of hooking lugs each having a hooking lug inner portion proximate to a central part of the at least one thrust washer with respect to a circumferential direction of the axis and located around the inner edge of the panel, and a hooking lug outer portion remote from the central part with respect to the circumferential direction and located around the inner edge of the panel, wherein the hooking lug inner portion of at least one of the plurality of hooking lugs is thinner in an axial direction of the axis than the hooking lug outer portion of the at least one of the plurality of hooking lugs; and
a semi-cylindrical half journal bearing shell having a respective opening at an axial end face corresponding to the at least one latching edge of each of the plurality of hooking lugs, wherein the respective opening via an edge is configured to engage against the hooking lug inner portion of each of the plurality of hooking lugs;
wherein the at least one latching edge of each of the plurality of hooking lugs is connected to the respective opening of the bearing shell to facilitate preventing disconnection of the at least one thrust washer and the bearing shell without deformation of the bearing shell.

15. A flange half-bearing according to claim 14, wherein the thrust washer further includes a bearing face provided with a plurality of oil distribution grooves extending to the inner edge of the panel, and at least one of the plurality of oil distribution grooves extends across the hooking lug inner portion of at least one of the plurality of hooking lugs.

16. A flange half-bearing according to claim 14, wherein the thrust washer further includes a stabilisation lug projecting inwardly from the inner edge of the panel and disposed intermediate to the plurality of hooking lugs.

17. A flange half-bearing according to claim 16, wherein the thrust washer further includes at least one oil distribution groove extending along the panel to the inner edge, wherein the at least one oil distribution groove extends across the stabilisation lug.

18. An engine, comprising:
a bearing assembly including a thrust washer and a semi-circular half journal bearing shell;
the thrust washer including:
a semi-annular panel extending about a rotation axis and having an inner edge and an outer edge;
a plurality of hooking lugs projecting inwardly from the inner edge of the panel, wherein the plurality of hooking lugs each have at least one latching edge;
the plurality of hooking lugs having a respective hooking lug inner portion proximate to a central part of the at least one thrust washer with respect to a circumferential direction of the axis and located around the inner edge of the panel, and a respective hooking lug outer portion remote from the central part with respect to the circumferential direction and located around the inner edge of the panel, wherein the respective hooking lug inner portion is thinner than the respective hooking lug outer portion;
a stabilisation lug projecting inwardly from the inner edge of the panel and disposed intermediate to the plurality of hooking lugs;
at least one oil distribution groove extending to the inner edge of the panel, wherein the at least one oil distribution groove extends across the stabilisation lug;
the bearing shell including an opening at an axial end face corresponding to the at least one latching edge of each of the plurality of hooking lugs, wherein the opening via an edge is configured to engage the hooking lug inner portion of each of the plurality of hooking lugs; and
wherein the at least one latching edge of each of the plurality of hooking lugs is connected to the corresponding opening of the bearing shell to facilitate preventing disconnection of the at least one thrust washer and the bearing shell without deformation of the bearing shell.

19. An engine according to claim 18, wherein the thrust washer further includes a bearing face provided with a plurality of other oil distribution grooves extending to the inner edge of the panel, and at least one of the plurality of other oil distribution grooves extends across the respective hooking lug inner portion of at least one of the plurality of hooking lugs.

20. An engine according to claim 19, wherein the at least one of the plurality of other oil distribution grooves further extends across the respective hooking lug outer portion of the at least one of the plurality of hooking lugs.

* * * * *